May 16, 1967 R. J. BRESSON ETAL 3,319,554
SHUTTER EXPOSURE SETTING MECHANISM FOR A CAMERA
Filed March 25, 1965 3 Sheets-Sheet 1
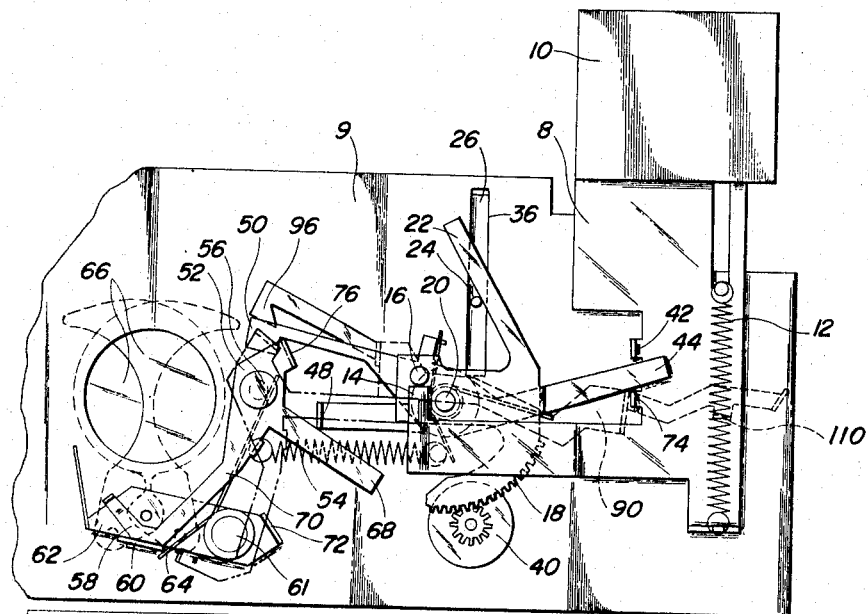
FIG.2
FIG.1
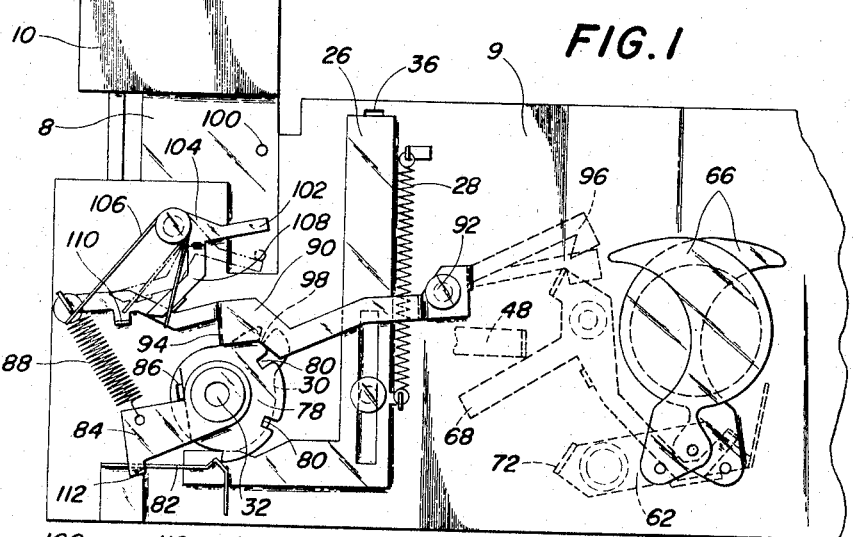
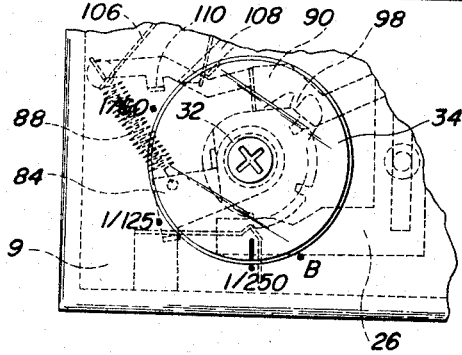
FIG.7
RICHARD J. BRESSON
ROBERT G. ELTON
INVENTORS
BY *R. Frank Smith*
*Steve W. Trimlow*
ATTORNEYS

RICHARD J. BRESSON
ROBERT G. ELTON
INVENTORS

United States Patent Office 3,319,554
Patented May 16, 1967

3,319,554
SHUTTER EXPOSURE SETTING MECHANISM
FOR A CAMERA
Richard J. Bresson, Rochester, and Robert G. Elton, Spencerport, N.Y., assignors to Eastman Kodak Company, Rochester, N.Y., a corporation of New Jersey
Filed Mar. 25, 1965, Ser. No. 442,609
6 Claims. (Cl. 95—53)

This invention relates generally to shutter mechanisms, and more specifically to an improved shutter exposure setting mechanism for a camera.

Cameras having a shutter exposure setting mechanism for altering the duration of the exposure are well known in the art. In addition to altering the duration of the exposure by various increments of time, such mechanisms may have a "bulb" setting for "bulb" exposures. For the purposes of this application, a "bulb" exposure is defined as one in which the initial depression of the shptter release button causes the shutter blades to be moved into an open or aperture-uncovering position to allow the passage of light to the photosensitive film, and to remain in the open position as long as the shutter release button is manually depressed. Release of the shutter release member causes the shutter blades to return to their normally closed or aperture-covering position to terminate the exposure. In all of the cameras that applicant is aware of, once the shutter speed setting member is moved into a "bulb" position, the camera will continue to take "bulb" exposures every time the shutter release member is depressed and released. This will result in film spoilage in those situations in which the operator inadvertently fails to notice that the camera had previously been set for a "bulb" exposure, and does not return the setting member to the desired exposure setting, such as ½50, ½25, or ⅒ of a second.

This invention is broadly directed to an improved shutter exposure setting mechanism including within its scope a camera having means therein for automatically returning an exposure setting member to an initial exposure position such as ½50 of a second while or during the time the "bulb" exposure is being taken. Accordingly, each time the operator desires to take a "bulb" exposure, it is necessary for him to manually move the exposure setting member into the "bulb" exposure position.

One of the objects of the present invention is to provide an improved shutter exposure setting mechanism for a camera in which an exposure setting member is automatically returned to an initial exposure setting position during the time the "bulb" exposure is being taken.

Another object of the invention is to provide an improved shutter exposure setting mechanism for a camera for automatically returning an exposure setting member from a "bulb" exposure setting to an initial exposure setting position simultaneously with the movement of the shutter blades to their open position.

Another object of the invention is to provide an improved shutter exposure setting mechanism of simple design and construction, thoroughly reliable and efficient in operation, and economical to manufacture.

Objects and advantages other than those set forth above would be apparent from the following description when read in connection with the accompanying drawings, in which:

FIG. 1 is a front elevation schematic view of a preferred embodiment of a shutter exposure setting mechanism for a camera in which an exposure setting member is in a ½50 second exposure position, a shutter release member is in its normal inoperative position and the exposure setting control knob is omitted for purposes of clarity;

FIG. 2 is a rear elevation view of the shutter exposure setting mechanism of FIG. 1;

FIG. 7 is a segmental front elevation view showing the exposure setting control knob.

Figure 4:
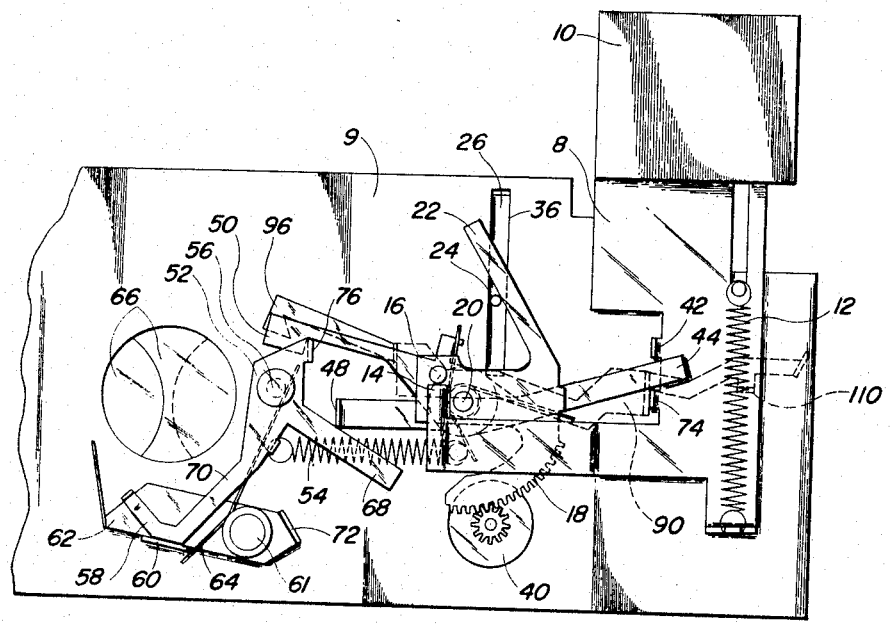
FIG. 4 is a rear elevation view of the shutter exposure setting mechanism of FIG. 3.

Referring to the drawings, an illustrated embodiment of a shutter exposure setting mechanism is disclosed in a camera having a control means including a shutter release slide member 8 movable on a base plate 9 from a normal inoperative position to an operative position when a button 10 is manually depressed by the camera operator to take an exposure. When the release member 8 is depressed against the bias of a spring 12, a foot 14 thereon moves away from a striker pin 16 mounted upon a time delay sector 18. This permits sector 18 to move under spring tension in a counterclockwise direction about an axle 20 on plate 9 until a cam arm 22 of time delay sector 18 engages a shutter speed control pin 24 staked to a shutter speed slide 26. The slide 26 is biased by a spring 28 into engagement with a cam disk 30 secured to a stub shaft 32 rotatably mounted on plate 9. As the shutter speed slide 26 is moved downwardly along a slot 36 in response to the manual setting of a control knob 34 secured to shaft 32, the speed control pin 24 moves from its position for maximum shutter speed downwardly in slot 36. The cam arm 22 cooperates with speed control pin 24 to determine the distance time delay sector 18 will move under its spring bias. The lower the position of speed control pin 24, the greater the rotational movement of sector 18, and the more gear teeth on sector 18 which mesh with and move over the gear teeth on a retard weight 40. The further the gear teeth on the bottom of sector 18 move to the right as seen in FIG. 2 prior to the stopping of the sector by the engagement of cam arm 22 with speed control pin 24, the slower the resulting shutter speed will be, as will be explained below.

As best shown in FIG. 2, as the shutter release slide member 8 is depressed, a lug 42 on the slide member forces a lever 44 to move in a clockwise direction about axle 20 on plate 9. Close to the bottom of the travel of slide member 8, a toe 48 of lever 44 engages a latch lever 50 and forces lever 50 also to rotate in a clockwise direction about axle 20. This results in a release of a shutter actuating lever 52 which then rotates by virtue of a spring 54 in a counterclockwise direction about a pivot 56. A heel 58 of lever 52 contacts a lug 60 of a blade actuating lever 62 and causes it to pivot about a pin 61 on plate 9 against the bias of a spring 64, moving shutter blades 66 to their open position by virtue of a pin and cam arrangement as is well known in the art. After blades 66 have been completely opened, an arm 68 of shutter actuating lever 52 contacts striker pin 16 on time delay sector 18 and forces the sector to move in a clockwise direction about axle 20 as seen in FIG. 2. The gear teeth of retard weight 40 mesh with the gear teeth at the bottom of sector 18, thus slowing the movement of sector 18. The desired shutter delay is determined by the distance through which the time delay sector 18 must rotate prior to the time that arm 68 of shutter actuating lever 52 slips off striker pin 16. When heel 58 rides over lug 60, shutter blades 66 are forced closed by spring 64, and held closed by arm 70 of shutter actuating lever 52 bearing against a lug 72 of blade actuating lever 62.

Figure 6:
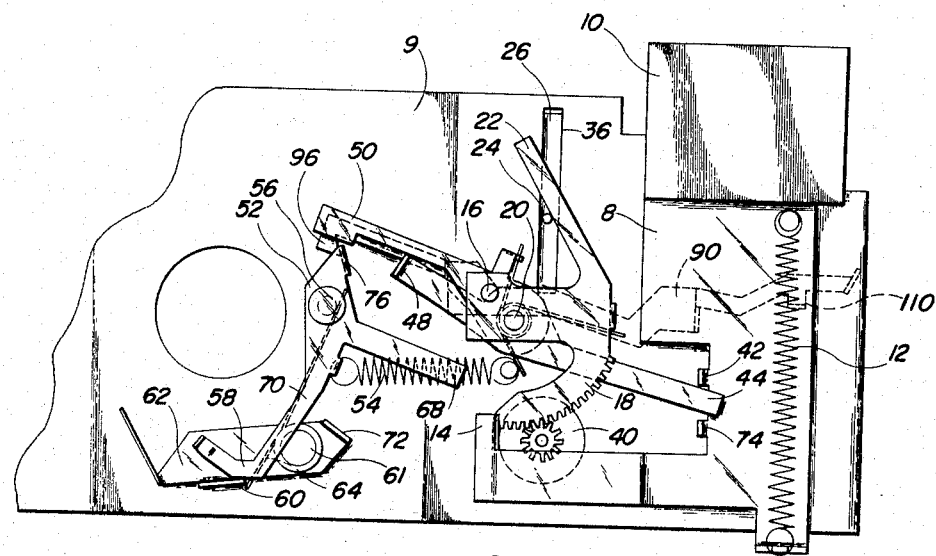
FIG. 6 is a rear elevation view of the mechanism of FIG. 5.

As the shutter release slide member 8 is permitted to return upwardly to its normal inoperative position under the influence of its spring 12, lever 44, as seen in FIG. 6, is driven in a counterclockwise direction by a lug 74 of release member 8. Toe 48 of lever 44 then engages arm 68 of shutter actuating lever 52, driving it in a clockwise direction against the bias of spring 54, which is weaker than spring 12, until a lug 76 thereon is latched by the hooked end of latch lever 50. During such movement of lever 52, heel 58 which is flexible and has an upturned end rides over lug 60 of blade lever 62, and the shutter mechanism is reset.

Figure 3:
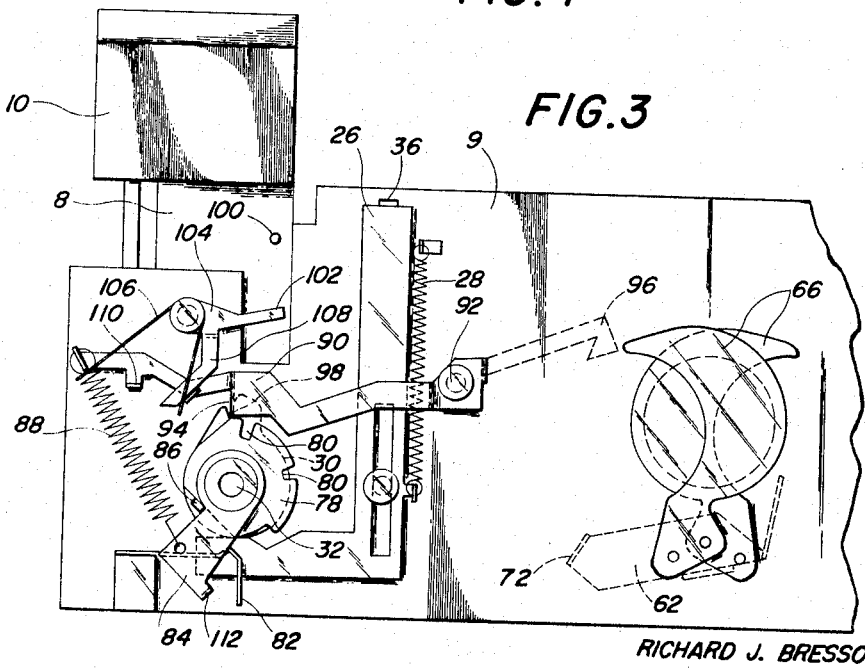
FIG. 3 is a front elevation view similar to FIG. 1 with the shutter exposure setting member in its "bulb" position.

Another cam disk 78 is staked to disk 30, and the periphery of disk 78 has notches 80 therein cooperating with a spring member 82 to provide a detent for releasably holding the exposure control knob 34 in any selected position. An arm 84 is loosely mounted on shaft 32 and is picked up by a lug 86 on cam disk 78 when knob 34 is turned to the "bulb" position, thereby tensioning a spring 88, one end of which is secured to arm 84 and its opposite end secured to the end of a lever 90 pivoted at 92. Lever 90 has a lug 94 riding on the periphery of cam disk 30. When control knob 34 is moved counterclockwise as seen in FIGS. 3 and 7 to the "bulb" position, disk 30 pivots lever 90 in a clockwise direction about pivot 92 causing a blocking or arresting hook 96 at one end of lever 90 to move into or block the path of lug 76 on actuating lever 52, and the opposite end of lever 90 to further tension spring 88. The lug 94 on lever 90 also bottoms in a notch 98 in cam disk 30 to releasably hold disk 30 and knob 34 in the "bulb" position.

Figure 5:
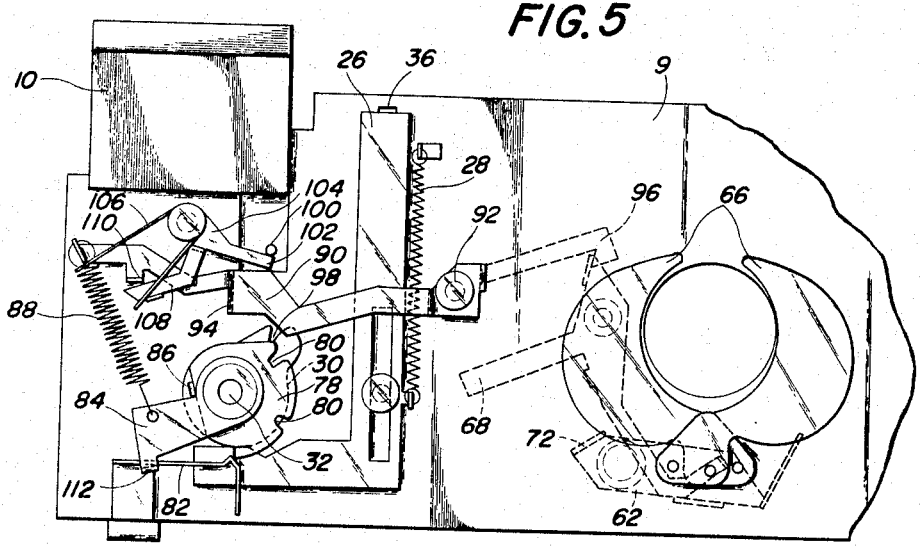
FIG. 5 is a view similar to FIG. 3 with the shutter release member moved to its operative position to take a "bulb" exposure.

When, now, the shutter release member 8 is depressed and shortly before it reaches its lowermost position, toe 48 engages latch lever 50 and urges it in a clockwise direction releasing shutter actuating lever 52 just as before. Now, however, lever 52 is moved by its spring 54 in a counterclockwise direction until its lug 76 strikes blocking hook 96 arresting or preventing any further movement (see FIG. 4) of the shutter. In this position, heel 58 of lever 52 has moved lever 62 in a position holding shutter blades 66 in their open position. The shutter blades 66 remain in their open position as long as shutter release member 8 is held in its lowermost position. At substantially the same time as release member 8 releases shutter actuating lever 52, a pin 100 staked to release member 8 engages an arm 102 of lever 104 for turning lever 104 in a clockwise direction (see FIG. 5) against the bias of a spring 106. This causes another arm 108 of lever 104 to engage a lug 110 on lever 90 and move lever 90 further in a clockwise direction withdrawing lug 94 from notch 98 to release cam disk 30, whereupon the tensioned spring 88 returns the exposure control knob 34, disks 30, 78 and arm 84 to their initial position. A lug 112 on arm 84 engages spring 82 to provide a positive stop for knob 34 when the initial or 1/250 exposure position is achieved.

The movement of lever 52 from its release position to the position in which it is arrested or stopped by hook 96 occurs simultaneously with the movement of exposure control knob 34 back to its initial position. This is desirable since if such knob movement and associated noise occurs subsequent to the lever movement, the operator may be misled into thinking the exposure has been automatically completed, and will release the release member 8 terminating the bulb exposure prematurely.

When shutter release member 8 is returned to its normal position, toe 48 engages arm 68 of lever 52 and returns it to its latched position against the bias of its spring 54. During such movement, heel 58 allows lever 62 to return shutter blades 66 to their closed position under the influence of spring 64 as seen in FIG. 1.

The invention has been described in detail with particular reference to a preferred embodiment thereof, but it will be understood that variations and modifications can be effected within the spirit and scope of the invention as described hereinabove and as defined in the appended claims.

We claim:

1. In a shutter exposure setting mechanism for a camera, the combination comprising:
   shutter means for making an exposure when released and including members movable between closed and open positions;
   means for releasing said shutter means to make an exposure;
   means for arresting said shutter means with said members in said open position after said shutter has been released by said releasing means;
   shutter speed setting means for said shutter means and movable from an initial position, in which said arresting means is ineffective, to a bulb position, in which said arresting means is effective; and
   means responsive to said releasing means when said shutter speed setting means is in its bulb position for returning said shutter speed setting means to its initial position when said shutter means is released to make an exposure.

2. The invention according to claim 1 wherein said returning means comprises a spring for biasing said shutter speed setting means to its initial position, detent means for releasably holding said shutter speed setting means in its bulb position against the bias of said spring, and means responsive to said releasing means for releasing said detent means.

3. In a shutter exposure setting mechanism for a camera, the combination comprising:
   blade means movable between closed and open positions to make an exposure;
   actuating means movable from a tensioned position for controlling movement of said blade means between said closed and open positions;
   blocking means for said actuating means movable to an operative position for stopping said actuating means when it has moved said blade means to said open position;
   a shutter speed setting member manually movable against the bias of a first spring from an initial position to a bulb position;
   detent means for releasably holding said setting member in its bulb position; and
   control means for said actuating, blocking, and detent means manually movable from a normal position to a first position for (1) releasing said actuating means from its tensioned poistion, (2) moving said blocking means to its operative position for stopping said actuating means when it has moved said blade means to its open position to start a bulb exposure, and (3) releasing said detent means allowing said tensioned first spring to return said setting member to its initial position; said control means when manually returned to its normal position returning said actuating means to its tensioned position allowing said blade means to return to closed position to complete the exposure.

4. The invention according to claim 3 wherein said detent and actuating means are released simultaneously.

5. The invention according to claim 4 wherein said control means comprises a manually movable release member, a pivotal lever interconnecting said release member to said actuating means, and a latch for holding said actuating means in its tensioned position and responsive to said pivotal lever for releasing said actuating means.

6. The invention according to claim 3 wherein said control means is biased into its normal position by a second spring, said lever in said normal position of said control means engaging and holding said actuating means in its tensioned position against the bias of a third spring weaker than said second spring, and said latch holding said actuating means in its tensioned position against the bias of said third spring when said lever is disengaged from said actuating means upon movement of said control means toward its first position.

References Cited by the Applicant

UNITED STATES PATENTS 3,125,939  3/1964  Bundschuh et al.
3,150,377  9/1964  Keznickl.

JOHN M. HORAN, *Primary Examiner.*